United States Patent [19]
Shades et al.

[11] Patent Number: 6,048,452
[45] Date of Patent: *Apr. 11, 2000

[54] WASTE TREATMENT DEVICE AND METHOD EMPLOYING THE SAME

[76] Inventors: R. C. Shades, 32136 Links Point, Laguna Niguel, Calif. 92677; Judie Forbes, 6 Tortosa, Aliso Viejo, Calif. 92656; Jack Slovak, 570 Tynerway, Incline Village, Nev. 89451; Robert Slovak, P.O. Box 9286, Incline Village, Calif. 89452; David Spears, 29416 Elba Dr., Laguna Niguel, Calif. 92677; Christina Edvardsson, 26316-A Paseo Del Mar, San Juan Capistrano, Calif. 92675; Sung Chiu, 13747 E. Philadelphia St., Whittier, Calif. 90601

[ * ] Notice: This patent is subject to a terminal disclaimer.

[21] Appl. No.: 09/007,351

[22] Filed: Jan. 15, 1998

Related U.S. Application Data

[63] Continuation-in-part of application No. 08/901,295, Jul. 5, 1997.

[51] Int. Cl.⁷ ............................ B01D 17/12; B01D 19/00
[52] U.S. Cl. ............................ 210/143; 96/218; 96/219; 210/180; 210/181; 210/184; 210/195; 210/259; 110/235
[58] Field of Search ..................................... 210/739, 748, 210/774, 805, 806, 143, 180, 181, 184–186, 192, 195, 257.1, 259; 110/250, 346, 185, 221, 235, 254; 55/428.1; 95/241, 254, 258, 259; 96/155, 218, 219; 422/186, 186.3

[56] References Cited

U.S. PATENT DOCUMENTS

| | | | |
|---|---|---|---|
| 3,762,549 | 10/1973 | Crampton | 210/180 |
| 5,191,184 | 3/1993 | Shin | 219/10.55 R |
| 5,447,630 | 9/1995 | Rummler | 210/186 |
| 5,725,762 | 3/1998 | Beal et al. | 210/181 |
| 5,843,304 | 12/1998 | Marchesseault et al. | 210/180 |
| 5,853,579 | 12/1998 | Rummler et al. | 210/180 |

*Primary Examiner*—Joseph W. Drodge
*Attorney, Agent, or Firm*—R. William Graham

[57] ABSTRACT

A waste treatment device for treating waste having both liquids and solids therein includes a primary waste reservoir, a solids processor operably connected to the primary waste reservoir to receive waste therefrom in a manner to permit combustion of a substantial part the solids and generate a resultant waste, ash and gas, a secondary waste reservoir operably connected to the solids processor to receive the resultant waste, and a liquid processor operably connected to the secondary waste reservoir to receive the resultant waste in a manner to separate at least a part of the resultant waste into an environmentally safe water and resultant waste concentrate. The device further includes a gas processor operably connected to the solids processor to treat the gas in a manner to render a resultant environmentally acceptable air, a conduit communicably interconnecting the primary waste reservoir and the secondary waste reservoir, apparatus for transferring the waste concentrate from the secondary waste reservoir to the solids processor. A controller regulates the processors and receipt and transfer of waste within the device.

81 Claims, 4 Drawing Sheets

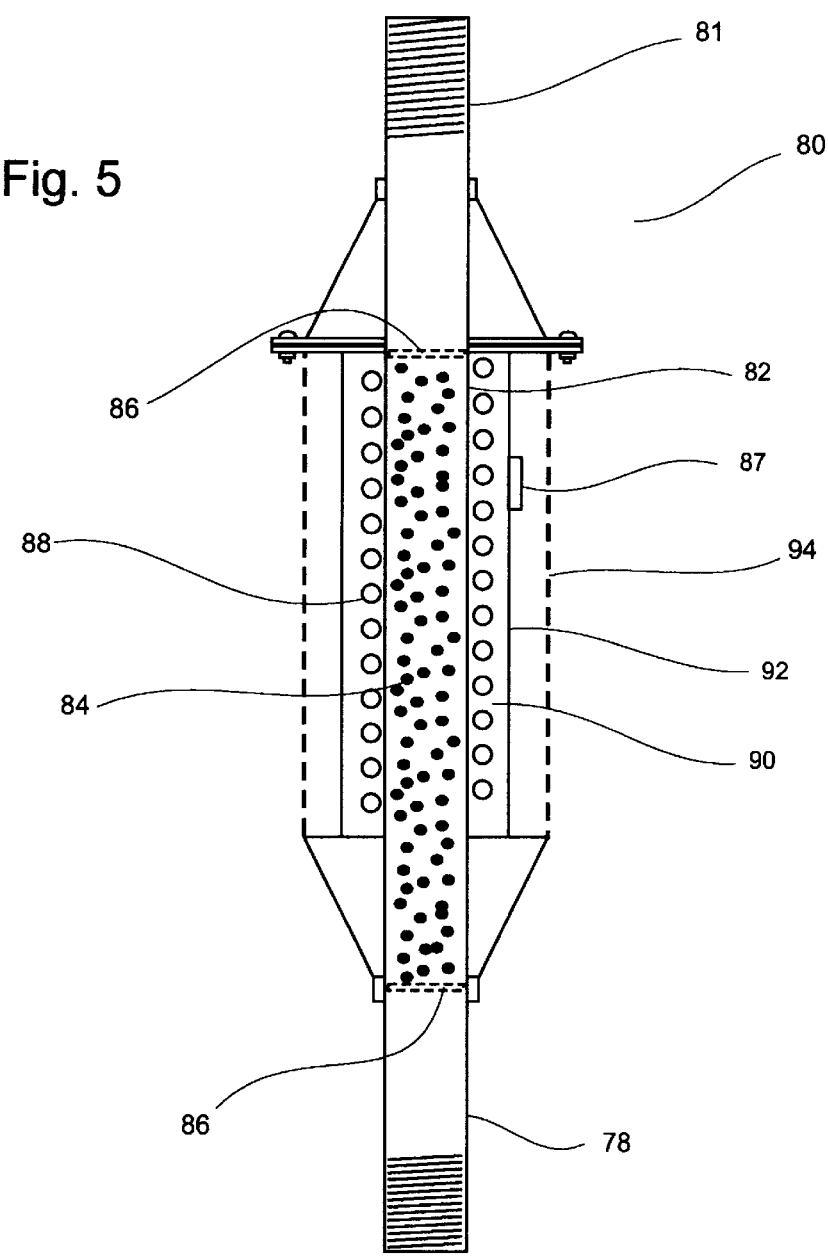
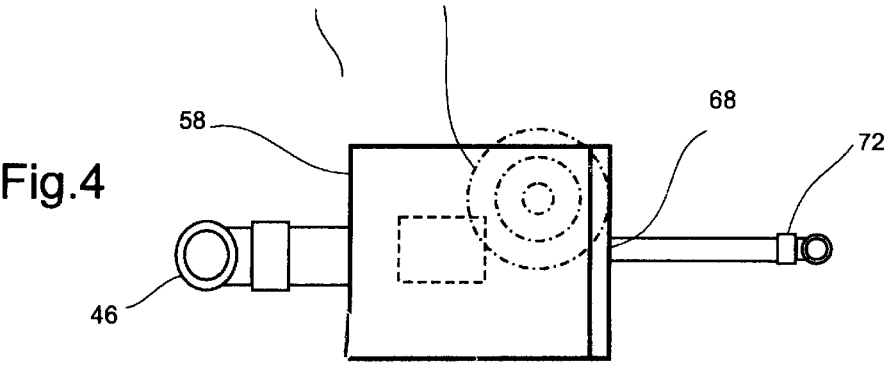

WASTE TREATMENT DEVICE AND METHOD EMPLOYING THE SAME

This a continuation-in-part of co-pending U.S. Ser. No. 08/901295 filed Jul. 5, 1997, now pending.

BACKGROUND OF THE INVENTION

1. Field of the Invention

The present invention relates to a device and method for treating waste. More particularly, the present invention is directed to a device and method which treats human and animal sewage, by way of incineration and purification.

2. Related Art

Human and animal waste is commonly known as occurring in two types, i.e., black water, e.g., fecal waste, and grey water, e.g., waste from all sources other than that including fecal material. There exist several devices for treating such waste. Most commonly are the governmental treatment facilities which exist in urban areas. These facilities are expensive and limited in the capacity of service which they can provide. Accordingly, residential and business development is limited as a function of capacity.

Attempts at solving this problem have resulted in the use of storage reservoirs (septic reservoirs and cesspools) which temporarily house the waste for subsequent removal and remote treatment. Other systems attempt on-site treatment of human waste. Some of these devices have employed microwaves in an incineration process of solids. Other devices employ filters in the purification process of fluids.

A goal of these devices is to treat the waste in a manner to make the resultant matter environmentally acceptable and substantially free of contaminants. However, these devices fail to adequately treat the waste in a manner to provide acceptable environmental disposability and/or reusability of certain constituents thereof. Another problem exists in that the gases which result as a biproduct of the incineration process are noxious and environmentally unfriendly.

Removal of fecal solid material (hereinafter referred to as "large particulate waste") as well as biochemical oxygen demand (BOD), chemical oxygen demand (COD), total suspended solids (TSS), bacteria, microbiological organisms, viruses, salts, phosphorous and nitrogen (hereinafter collectively referred to as "small particulate waste") generally remain a problem in the treatment of human and animal waste.

There remains a need to improve the devices which exist for treatment of human and animal waste. There also remains a need for a relatively inexpensive means to accomplish the above goals and overcome the aforesaid problems. The present invention sets forth a device and method which meet these needs.

BRIEF SUMMARY OF THE INVENTION

It is an object to improve waste disposal.

It is another object to treat disposal of human or animal waste in a more environmentally acceptable manner.

It is still another object to improve the device for treating disposal of human or animal waste in a more environmentally acceptable manner.

Accordingly, the present invention is directed to a waste treatment device. The device includes a primary waste reservoir, a solids processor operably connected to the primary waste reservoir to receive waste therefrom in a manner to permit combustion of a substantial part of the solids and generate a resultant waste, ash and gas, a secondary waste reservoir operably connected to the solids processor to receive the resultant waste, and a liquid processor operably connected to the secondary waste reservoir to receive the resultant waste in a manner to separate at least a part of the resultant waste into an environmentally safe water and a resultant waste concentrate.

The device further includes a gas processor operably connected to the solids processor to treat the gas in a manner to render a resultant environmentally acceptable air. A conduit communicably interconnects the primary waste reservoir and the secondary waste reservoir in a manner to permit flow of waste therebetween. Apparatus is included for transferring. A controller regulates the processors and receipt, flow and transfer of waste within the device.

The solids processor includes a ceramic or porous plate for generally separating large particulate waste from small particulate waste, a heating element and a microwave generator. The gas processor includes means for catalytically treating gas. The liquid processor includes means for filtering the small particulate waste.

A method for treating human waste which includes both solids and liquids is also provided. The method includes the steps of feeding the waste into an incineration chamber, elevating temperature of the waste to cause combustion of solids waste thereby splitting the resultant into a gaseous biproduct, ash and an aqueous biproduct having small concentrate particulate waste, and passing the resulting waste on through a membrane having sufficient small porosity to substantially preclude waste and ash from passing thereby. The small concentrate particulate waste is transferred to the incineration chamber and temperature elevated to cause combustion of the small particulate waste resulting in a gaseous biproduct and an increasingly purified aqueous biproduct. The method also includes catalytically treating the gaseous biproduct to substantially remove contaminants therefrom.

Other objects and advantages will be readily apparent to those skilled in the art upon viewing the drawings and reading the detailed description hereafter.

BRIEF DESCRIPTION OF THE DRAWINGS

FIG. 4 is an elevational view of a part of the present invention.

FIG. 5 is a top sectional view of a part of the present invention.

DETAILED DESCRIPTION OF THE INVENTION

Figure 1:
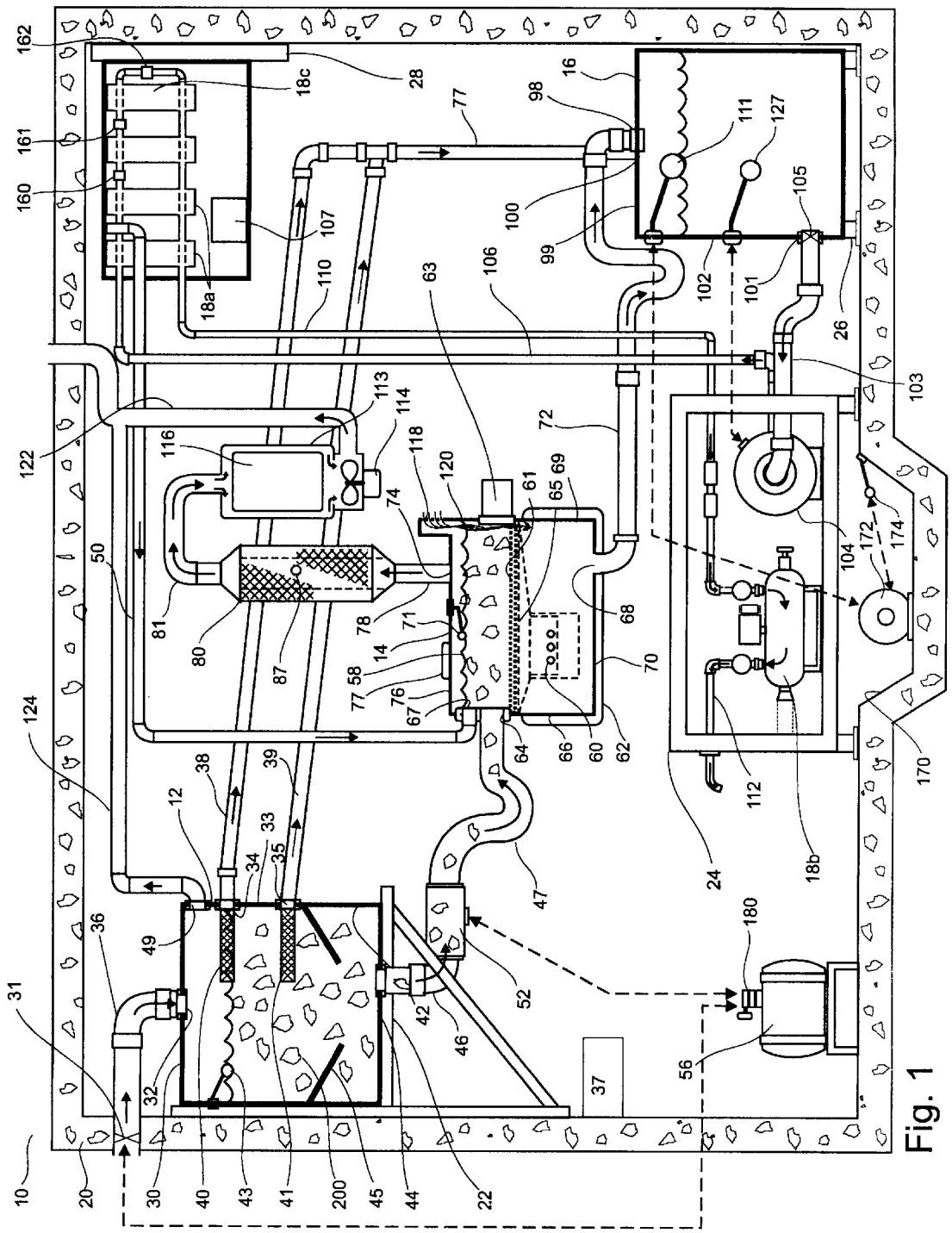
FIG. 1 is an elevational schematic view of an embodiment of the present invention.
Figure 2:
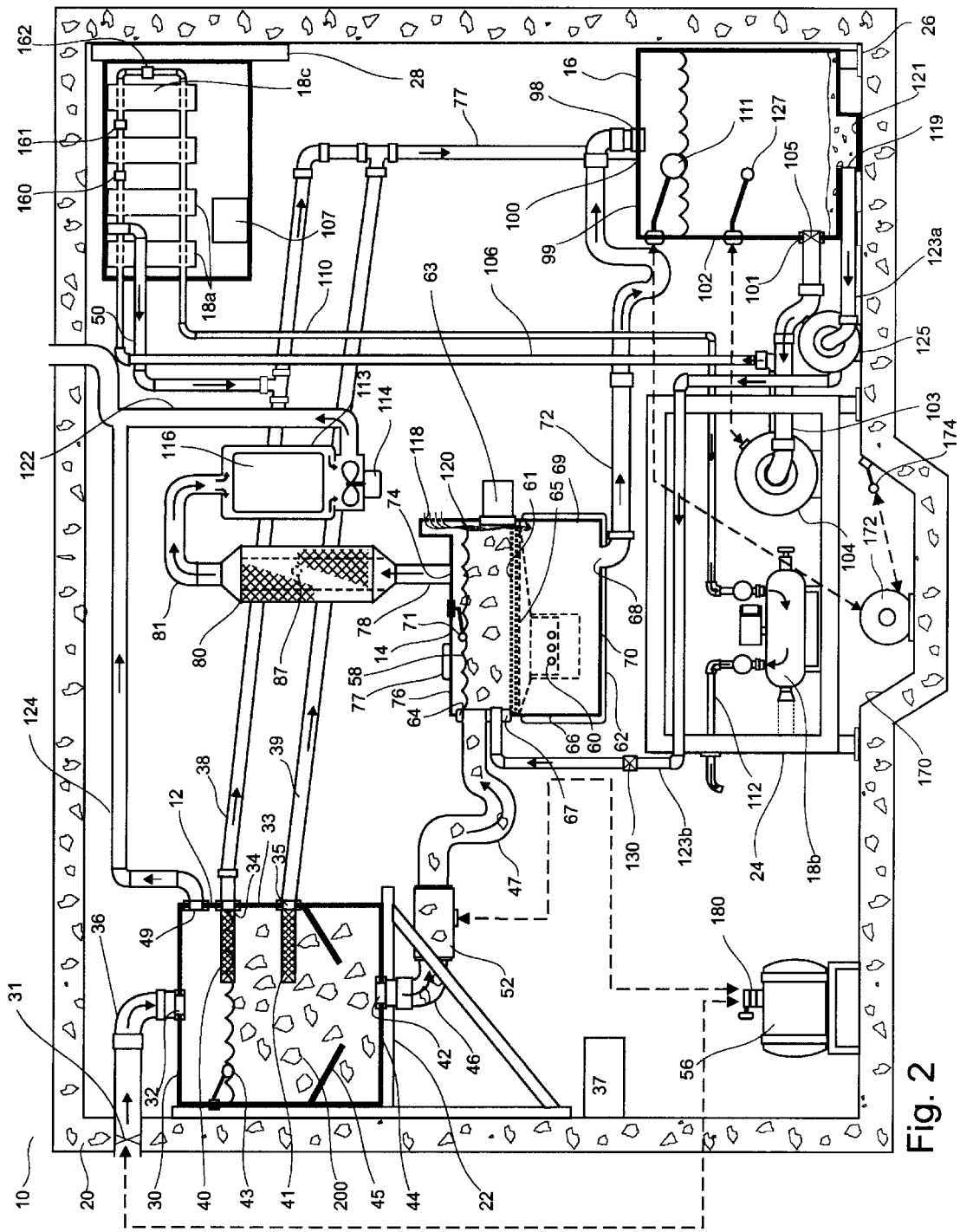
FIG. 2 is an elevational schematic view of another embodiment of the present invention.
Figure 3:
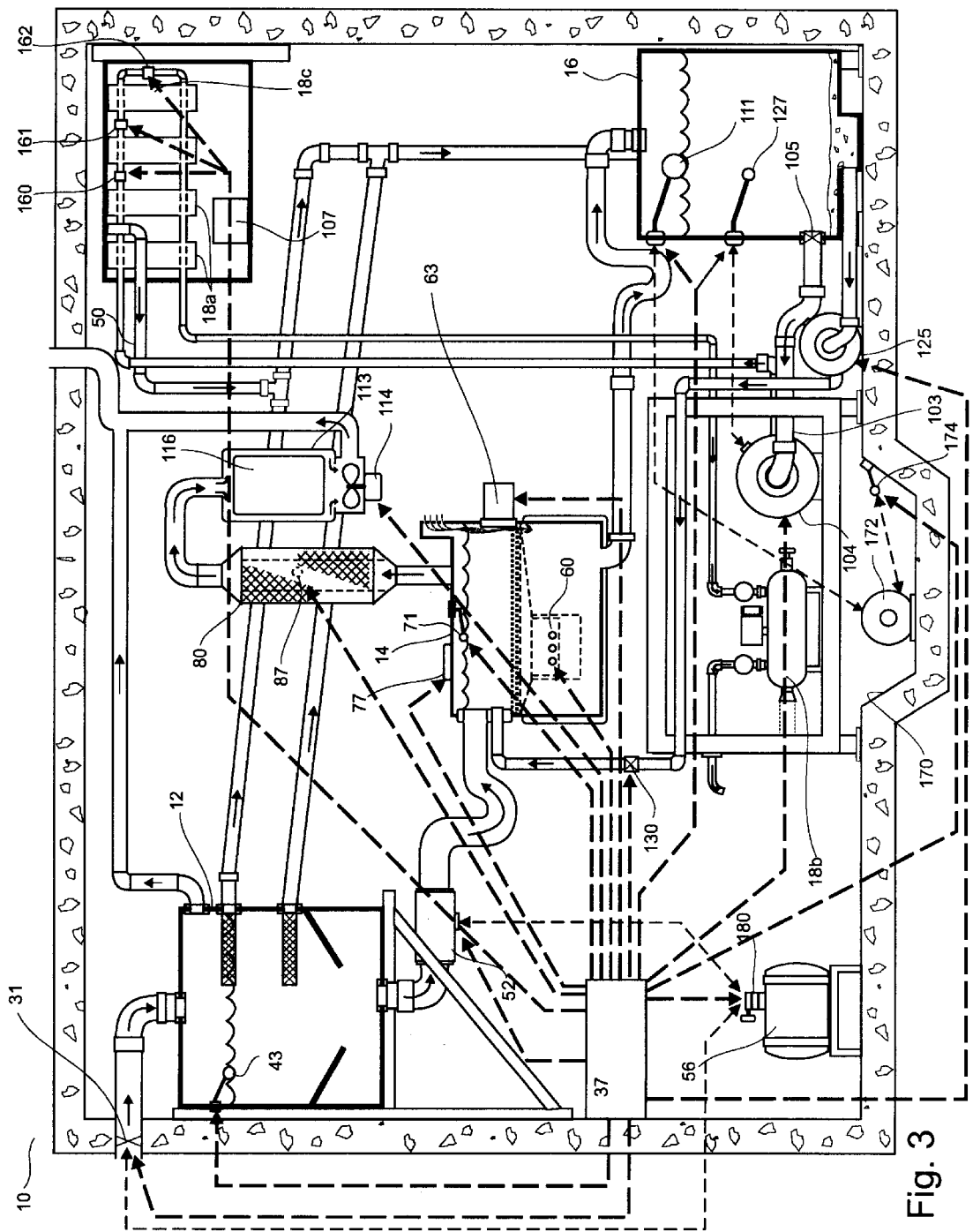
FIG. 3 is a schematic view showing electrical connections of the present invention.

Referring now to the drawings, a waste treatment device of the present invention is generally designated by the numeral 10. The waste treatment device 10 generally includes a primary waste reservoir 12 for receiving mixed solid and aqueous waste 200 of the human or animal type, a solids-gas processor 14 operably connected to the primary waste reservoir 12, a secondary waste reservoir 16 operably connected to the solids-gas processor 14 and the primary waste reservoir 12 and liquid processor 18a, 18b, 18c operably connected to the secondary waste reservoir 16. In the embodiment of FIG. 1, the secondary waste reservoir 16 is operably connected to the liquid processor 18. FIG. 2 shows the liquid processor 18 operably connected to the solid-gas processor 14. The waste treatment device 10 is preferably housed in a subterranean structure 20 preferably made of fiberglass or a like suitable material.

More particularly, the structure 20 is generally rectangular and has connected thereto a plurality of support structures 22, 24, 26 and 28. Support structure 22 supportively connects the primary waste reservoir 12. Support structure 24 supportively connects both the solids-gas processor 14 and liquid processor device 18b. The support structure 26 supportively connects the secondary waste reservoir 16 and structure 28 supportively connects liquid processor 18a and 18c. The particular orientation of the above described is set forth by way of example and is not intended to be limiting in the scope of the invention.

The primary waste reservoir 12 includes a sealable lid 30 having an open surface 32. A sewage inlet conduit 36 sealingly connects to the open surface 32 in a manner to permit fluid communication from the sewage inlet conduit 36 to the primary waste reservoir 12. A primary solenoid valve 31 is operably disposed in the inlet conduit 36 and connected to a compressor 56 which is controlled by a computer based system 37 more particularly described hereinafter.

A side 33 of the primary waste reservoir 12 has open surfaces 34 and 35, wherein the open surface 34 is adjacent the lid 30 and the open surface 35 is further laterally displaced from the lid 30. An overflow conduit 38 sealingly connects to the open surface 34 in a manner to permit fluid communication from the waste reservoir 12 to the overflow conduit 38 and secondary waste reservoir 16. Another fluid removal conduit 39 sealingly connects to the open surface 35 in a manner to permit regular fluid flow from the primary waste reservoir 12 to the conduit 39 and in turn thus preferably removing liquid before increased dissolved solids form therein. Solids retention screens 40 and 41 are operatively connected adjacent the open surfaces 34 and 35, respectively in a manner to block solids from passing into the conduits 38 and 39, respectively. Baffles 45 are mounted in the primary waste reservoir 12 to direct and retain solids adjacent a bottom 44 of the primary waste reservoir 12. The primary waste reservoir 12 also includes a float switch 43 operably connected to the computer based system 37 as will be further described hereinafter.

The side 33 has another open surface 42 in the bottom 44. An outflow conduit 46 sealingly connects to the open surface 42 in a manner to permit waste 200 to flow from the primary waste reservoir 12 to the outflow conduit 46. The conduit 46 includes a trap 47 to prevent gases from moving back toward the primary waste reservoir 12. Open surface 49 is formed in the side 33 to which a vent line 124 connects.

A solenoid valve 52 is disposed in the conduit 46 and controlled by computer based system 37. The outflow conduit 46 is operatively connected to the compressor 56 which is controlled by the computer-based system 37.

Within the solids-gas processor 14 is an incineration chamber 58 which includes burner elements 60 and a ceramic porous plate 61 disposed adjacent one another. Insulation wrap 62 is provided about the chamber 58. The ceramic porous plate 61 is supported by a support frame 65. A microwave device 63 which includes a magnetron, mica shield, magnetron blower and cooling fan, transformer and power conditioning components is operatively disposed to the incineration chamber 58 and connected to the computer based system 37. A temperature sensor 77 is operatively disposed within the incineration chamber 58 and connected to the computer based system 37. The cooling fan keeps the magnetron from overheating. A thermal switch is installed on the magnetron and prevents overheating and will turn off the magnetron when it reaches a preset temperature, e.g., 280° F. The switch will automatically reset itself once the temperature of the magnetron falls below another preset temperature e.g., 245° F. The incineration chamber 58 is likewise controlled by the computer-based system 37 as later herein described.

Open surface 64 and 67 are defined within an upper portion of side 66 of the incineration chamber 58. Another end of the outflow conduit 46 sealingly connects to the open surface 64 in a manner to permit waste to flow from the outflow conduit 46 to the incineration chamber 58. An open surface 68 is defined in a portion of a bottom 70 of the incineration chamber 58 to which one end of a conduit 72 sealingly connects to permit fluid flow thereto. A float switch mechanism 71 is operably disposed in an upper portion of the incineration chamber 58 and operably connected to the computer-based system 37 as further described hereinafter.

A vented portion 118 is provided in the incineration chamber 58 to permit air intake 120 therein. The vented portion 118 is adjacent and above the microwave device 63 and is of a size and shape to effectively contribute the amount of combustion air which is required in the incineration process. Also, this permits air flow continuously past the magnetron mica shield (window) which protects the magnetron by providing a cleaning action. The vented portion 118 also creates a slight vacuum during the processing which draws against other interfaces such of the chamber 58 to eliminate leakage of steam and smoke.

Another open surface 74 is defined in a top 76 of the incineration chamber 58. An end of an exhaust pipe 78 sealingly connects the open surface 74. Another end of the exhaust pipe 78 sealingly connects to a one end of a catalytic converter 80 of the processor 14, the particulars of which are best seen in FIG. 5. Another end of the catalytic converter 80 connects to a conduit 81 which in turn connects to a generally cylindrical annular heat exchanger 113.

The heat exchanger 113 has an air pocket 116 in its central region about which treated and cleaned air from the catalytic converter 80 moves. The heat exchanger 113 includes a power driven fan 114 to draw the cleaned air through the exchanger 113. An exhaust conduit 122 connects to another end of the heat exchanger 113 and extends outside the structure 20 to vent the cleaned air to above ground. The vent line 124 connects to the exhaust conduit 122 prior to exiting the structure 20.

The catalytic converter 80 includes a generally annular chamber 82 which has operatively disposed therein a plurality of catalytic conversion particles or pellets 84 which are retained by retention screens 86. The chamber 82 is preferably stainless steel and the pellets 84 are preferably platinum coated and found to be highly suitable for removing contaminants from gases passing therethrough. It has been found that preheating the platinum coated pellets 84 a predetermined amount of between about 700 and 1200 Fahrenheit provides enhanced performance and exhausts air into the environment which has been substantially decontaminated. This enhanced performance was not heretofore known. Operatively disposed in an encircling manner about the chamber 82 is an electrical heating coil 88 which is operatively connected to the electrical supply and computer based system 37. A temperature sensor 87 is operatively disposed in the converter 80 and connected to the computer based system 37. A generally annular heat conductive sleeve 90, preferably made of ceramic fiber, substantially encases the coil 88 and chamber 82. A retaining jacket 92, preferably made of stainless steel, houses the sleeve 90, coil 88, chamber 82 pellets 84 and screens 86. A generally annular shaped heat shield 94, preferably made of a perforated stainless steel, is of a size and configuration to substantially extend about the retaining jacket 92 in an interconnected manner such that the shield 94 is annularly spaced from the retaining jacket 92. In this way cool air circulation is permitted about and between the retaining jacket 92 and the shield 94.

The catalytic converter 80 is located on top of the processor 14 where the exhaust gases exit the processor 14. The catalytic converter 80 will remove minute particles and odors from the exhausted byproduct. The heat by creating a suction and din this process by creating a suction and directing the air flow through exhaust conduits 81 and 122.

The secondary waste reservoir 16 has an open surface 98 in its top side 99 to which a conduit 72 connects to permit a resultant waste to flow from the incineration chamber 58. Another open surface 100 is defined in the top side 99 to which an end of conduit 77 is sealingly connected in a manner to permit fluid flow into the secondary waste reservoir 16. Another end of the conduits 38 and 39 sealingly connect to the conduit 77 in a manner to permit fluid flow into the conduit 77 and in turn the secondary waste reservoir 16 from the primary waste reservoir 12. Another open surface 101 is defined in a side 102 to which an end of conduit 103 is sealingly connected in a manner to permit fluid flow from the secondary waste reservoir 16 to the liquid processor 18.

Still another open surface 119 is formed in a bottom 121 of the secondary waste reservoir 16. A conduit 123a is sealingly connected to open surface 119 and pump 125. Another conduit 123b sealingly interconnects to open surface 67 and pump 125. Pump 125 is operatively connected to computer based device 37.

The secondary waste reservoir 16 has two mechanical float switches 111 and 127 which will provide three levels of indications, "Low, High, and High High," to the computer-based device 37. The float switch 127 is operably connected to the computer based device 37 which controls the pump 104 and also direct wired to the pump 104. Another end of the conduit 103 is sealingly connected to an inlet of a pump 104. Pump 104 is operatively connected to the computer based system 37 which is triggered by the float switch 127 reaching a predetermined height. An end of conduit 106 is sealingly connected to an outlet of pump 104. The computer based device 37 controls the pump 125 as seen in FIG. 2 such that the pump 125 is activated at a predetermined time of each day, preferably after the float switch 127 has moved to the low position.

Another end of conduit 106 is sealingly connected to an inlet of liquid processor 18a. The liquid processor 18a including membrane filters, such as an ultrafilter, and 18c including carbon filters, which are arranged in series so that the incoming fluid sequentially travels through the filters 18a and 18c. As seen in FIG. 2, another end of backflow conduit 50 is sealingly connected to the liquid processor 18a and 18c in a manner to permit suspended aqueous/solids or concentrate to flow back to the secondary waste reservoir 16 via a connection between conduit 50 and conduit 38.

An end of a return conduit 110 is sealingly connected to the liquid processor 18a and 18c in a manner to permit filtered fluid flow therefrom. Another end of a return conduit 110 is sealingly connected to the liquid processor 18b in a manner to permit the membrane filtered fluid flow therethrough. The purification device 18b is a UV light treatment device which rids the filtered water of remaining biological contaminants. Another outflow line 112 is sealingly connected to the liquid processor 18b in a manner to permit irradiated filtered fluid (substantially clean water) to flow from the liquid processor 18b.

In general, the operation of device 10 is as follows. The waste 200 includes both solids and liquids and is controllably gravity fed to the primary waste reservoir 12. The waste 200 is preferably substantially separated in the primary waste reservoir 12 in a manner to substantially direct solids away from entering the secondary waste reservoir 16 and such that the solids are controllably fed into the incineration chamber 58. Liquids including dissolved solids and some minor suspended solids are permitted to pass through the ceramic pourous plate 61.

After substantially all fluid has drained out of the incineration chamber 58 and upon the waste level reaching a predetermined level in the incineration chamber 58, incineration begins. The heating elements 60, ceramic porous plate 61 and microwave device 63 are employed to sufficiently elevate the temperature of the waste to cause combustion thereof resulting in gaseous and ash biproduct. Gaseous biproducts are catalytically treated to remove contaminants using the catalytic converter 80. Ash is controllably fed into the secondary waste reservoir 16 with other waste fluids from the primary waste reservoir 12 via conduit 38. Such waste fluids are purified by way of membrane filtration and irradiation to provide resultant clean water using the filters 18a and 18c and the UV light treatment device 18b.

The computer-based device 37 consists of a miniature programmable controller and includes a CPU, RAM, hard disk and communications link, such as a modem. The computer-based device 37 will preferably transmit one of two types of alarms: level-1—wherein the computer-based device 37 will shut down the device via closing the primary valve 31 and signaling an immediate need of service; and level-2—wherein the computer-based device 37 permits use of the device 10 and signals a need for service within a reasonable period of time.

The computer-based device 37 will control and monitor the device 10. All indications and alarms will be logged with extensive data collection for recording performance data and reported back to the remote site as earlier described. The computer-based device 37 will have communications software and can be remotely queried and reprogrammed via the modem. Also, software will be resident for controlling the operations of the device 10 as described herein.

The solenoid valve 31 is an actuated valve controlled by computer-based device 37 which allows the raw sewage from the house or source to flow into the primary waste reservoir 12. The valve 31 has a limit switch installed to provide "open" and "closed" indication to the computer-based device 37. When the valve 31 is neither in an open or closed state and after it has been requested to be open or closed for a predetermined period, 2 seconds, for example, the computer-based device 37 will indicate a malfunction. This malfunction is indicated via sounding an alarm and/or displaying a signal such as "Primary Inlet Solenoid Valve Failed To Open" and "Primary Inlet Solenoid Valve Failed To Close," respectively and/or transmitting a signal to a remote site for receipt thereof by a remotely located attendant. This will be a level 1 alarm resulting in shutting down the system. The computer-based device 37 is equipped with software and hardware for transmitting to a remote site the alarm status via modems and telephone lines, for example.

As the primary waste reservoir 12 fills, solids will settle to the bottom 22 of the primary waste reservoir 12 with the aid of baffles 45 while grease and other lighter dissolved and suspended solids will substantially remain at the top. The float switch 43 will provide two levels of indications, "Low" and "High High" to the computer based device 37. "Low" level will serve as an inactive status indication and "High High" level will be a Level-1 alarm. At "High High" level, the waste will be above the overflow level and the computer-based device 37 will command the solenoid valve 31 to close via the compressor 56. When the alarm conditions clear, the computer-based device 37 will command the solenoid valve 31 to open.

The solenoid valve 52 allows the waste 200 from the primary waste reservoir 12 to flow to the incineration chamber 58. The valve 52 will be controlled by the computer-based device 37 using software which monitors the drain rate of the waste and the "Hi" and "Low" level status of the float switch 71 in the incineration chamber 58.

When the waste reaches the "Hi" level in the incineration chamber 58, the computer-based device 37 will close the outgoing valve 52 via the compressor 56. When the level reaches the "Low" level and the drain rate is equal or less than a predetermined rate in which the float switch 71 moves from high to low positions or predetermined time (e.g., 15 minutes), the computer-based device 37 will open the solenoid valve 52. If the drain rate or the time it takes the fluid in the incineration chamber 58 to drain from "Hi" to "Low" level, exceeds the predetermined rate or time, a signal is generated which indicates that there exist solids which inhibit flow in the incineration chamber 58. The computer-based device 37 will keep the solenoid valve 52 closed and initiate a "Demand" combustion cycle in the processor 14. If the conditions remain the same, a level 1 alarm signal will be generated by computer-based device 37 as previously described. The solenoid valves 52 and 31 will have a limit switch installed to provide "open" and "closed" indications. When either of the solenoid valves 52 and 31 is neither in an open or closed state, after they have been commanded to be open or closed, respectively, for a predetermined time (e.g., 2 seconds), an alarm will occur, "Valve Failure to Open" or "Valve Failure to Close," respectively. This will be a level 1 alarm and the computer-based device 37 will close the solenoid valve 31.

A temperature sensor 87 in the catalytic converter 80 is operatively connected to the computer-based device 37. When a "Demand" burn cycle is initiated, the computer-based device 37 will command the catalytic converter 80 heating coil 88 to turn on. When the temperature in the catalytic converter 80 reaches a predetermined temperature (e.g., 300° F.), the computer-based device 37 will command the heat exchanger fan 114, the magnetron cooling fan and the magnetron to turn on. After a predetermined period (e.g., 5 minutes), the heating coil 60 is turned on. When the temperature in the incineration chamber 58 has reached the predetermined temperature (e.g., 300° F.), the computer-based device 37 will command the catalytic converter heating coil 88 to turn off.

The computer-based device 37 will cause the heat exchanger fan 114 to turn on at the beginning of the combustion process within the processor 14 and will remain on until the incineration chamber 58 completes its process and has cooled down to another predetermined temperature (e.g., 200° F.). Once the cool down has been achieved, the computer-based device 37 will command the heat exchanger fan 114 to turn off. The cool down temperature will be sensed and determined by a temperature sensor 77 (thermocouple) in the incineration chamber 58 which is operably connected to the computer-based device 37.

The temperature sensor 87 in the catalytic converter 80 will also provide a means for the computer-based device 37 to determine if the catalytic converter 80 and the heat exchanger fan 114 are on or off. If after a predetermined period (e.g., 5 minutes) the temperature does not increase when the catalytic converter 80 is turned on, the computer-based device 37 will generate an alarm, "Catalytic Converter Fail to turn On" and transmit a signal to the remote site as previously described. If after a predetermined period (e.g., 5 minutes) the temperature does not decrease a predetermined amount when the heat exchanger fan 114 is on, the computer-based device 37 will alarm, "Heat Exchange Fan Failed to turn On" and transmit a signal to the remote site as previously described. In either case, this is characterized as a "Level 2" alarm which does not necessitate shutting down the device 10.

The float switch 71 is made of stainless steel, for example, and will provide "Hi" and "Low" level indications to the computer-based device 37. When the level is "Low" and the drain rate or the time it takes the fluid in the incineration chamber 58 to drain from "Hi" to "Lo" level, is acceptable, the computer-based device 37 will command the solenoid valve 52 to open. When the drain rate or time is unacceptable (e.g., 30 minutes), the computer-based device 37 will command the incineration chamber 58 to begin a combustion cycle on "Demand".

The temperature sensor 77 will measure the temperature rise due to the magnetron of the microwave device 63 and the heating element 60. At the beginning of the combustion process and after the catalytic converter 80 has reached the predetermined temperature (e.g., 300° F.), the computer-based device 37 will command the heat exchanger fan 114, the magnetron and the cooling fan of the microwave device 63 to turn on. If within 5 minutes the temperature in the processor 14 does not increase, the computer-based device 37 will alarm, "Magnetron Failed to turn On." If the temperature does increase, the computer-based device 37 will turn on the heating element 60. The temperature should increase rapidly indicating the heating element 60 is on. If not, the computer-based device 37 will alarm, "Heating Element Failed to turn On." Both the magnetron of the microwave 63 and heating element 60 will remain on until the temperature in the incineration chamber 58 reaches the predetermined time and temperature combination which assures complete combustion of the waste 200.

Typically, a complete combustion may take up to 1 hour or for example, until a temperature of 1100° F. is attained for 15 minutes. If after a 1 hour burn the temperature has not reached a predetermined temperature, e.g., 850° F., the computer-based device 37 will alarm with an "Incomplete Combustion" alarm. This would be a level 2 alarm. Should this incomplete burn occur again on the next demand burn, the computer-based device 37 will then alarm with a level 1 alarm as described above. When the burn process cycle is complete, the exhaust fan 114 will remain on until the temperature in the incineration chamber 58 has fallen below a predetermined temperature, e.g., 200° F. Once this has been achieved, the computer-based device 37 will open the solenoid valve 52.

If there is no combustion in a 24 hour period and the solenoid valve 52 has cycled at least once, the computer-based device 37 will commence a burn cycle at predetermined time of the day, 1:00 a.m. for example. If the solenoid valve 52 has not cycled in a 24 hour period, it is assumed that no use has occurred and no combustion is necessary.

The secondary waste reservoir 16 accepts liquid and certain dissolved and suspended solids waste from the primary waste reservoir 12 as described above from the conduits 38, 39 and 50 and also from the incineration chamber 58 via conduit 72. Switch 127 will provide a signal of "Low" which will initiate the computer-based device 37 to stop the pump 104. Switch 127 provides a "High" signal which will initiate the computer-based device 37 to start the pump 104. Switch 111 provides a "High High" level which will cause the computer-based device 37 to send a level 2 alarm and initiate the sump pump 172. After a predetermined time, e.g., 15 minutes, the computer-based device 37 to send a level 1 alarm "Secondary Waste Reservoir Overflow," to the remote site as described above that maintenance is required immediately and cause the valve 31 to close. The solenoid valve 52 will remain operative based on the incineration chamber float switch 71.

The pump 104 pumps the water from the secondary waste reservoir 16 through the filtration membranes 18*a* and will trap any impurities larger than a predetermined size (5 microns) and return them to the secondary waste reservoir 16 as shown in FIG. 1 (or to the incineration chamber 58 as in FIG. 2). The filtered liquid flows through UV device 18*b*.

The filtration pump 104 will be controlled by the computer-based device 37. When the level on the secondary waste reservoir 16 is "Low," the pump 104 will turn off. When the level is "High," the computer-based device 37 will command the filtration pump 104 to be turned on. If the level does not decrease in a predetermined time, e.g., 8 minutes, the computer-based device 37 will alarm with a level 2, "Filtration Pump Fail to Run." If the water level continues to rise to the "High High" level, the computer-based device 37 will alarm with a level 1, "Secondary Waste Reservoir Overflow." This could mean that the filtration pump 104 is not working or that it cannot handle the increase overflow and the device 10 will shut down.

When the water level in the secondary waste reservoir 16 reaches "High" level, the filtration pump 104 will turn on and circulate through the filters 18*a*. There are three pressure transducers 160, 161 and 162 with a 0 to 100 psi range. One pressure transducer 161 is installed on the inlet to the filters 18*c*, another pressure transducer 162 on an outlet, and another 160 on an outlet of the filters 18*a*. Depending on the configuration of the filters 18*a* and 18*c*, the pressure transducers 161 and 162 permit the computer-based device 37 to calculate the difference between the inlet and outlet pressures. If the differential pressure exceeds a predetermined pressure (e.g., 20 psi), the computer-based device 37 will alarm and indicate which filter is clogged. This is a level 2 alarm.

A sump 170 and a sump pump 172 installed in the structure 20 to catch any run-offs, leakage, and overflows from the device 10. The sump pump 172 will automatically turn on via internal level switch 174 which is wired into the computer-based device 37 for alarm indication, "Vault High Water." The sump pump 172 moves the overflow to the primary tank 12. The "Vault High Water" alarm will not be an immediate level 1 alarm. It will be a level 2 alarm for a predetermined period (e.g., 30 minutes) before converting to a level 1 alarm.

The air compressor 56 supplies air to the valves 31 and 52. There is a pressure switch 180 located on the air compressor 56 which will be wired into the computer-based device 37 for indication. The pressure switch 180 will activate the compressor 56 to turn on. When this happens, the computer-based device 37 will keep track the number of times the valves are activated until the next time the compressor 56 is turned on again. An average will be calculated by the computer-based device 37, valve cycles per compressor operation. The computer-based device 37 will use this average to monitor the performance of the air compressor 56. Should the air compressor 56 begin to leak, the valve cycles per compressor operation would decrease indicating reduced efficiency. When the efficiency has been reduced below an acceptable level, e.g., 20%, the computer-based device 37 would then alarm, "Air Compressor is Leaking." This is only a level 2 alarm.

Should power failure occur, the computer-based device 37 will record the last state of events and keep a running time of the power failure duration. When power is returned, the computer-based device 37 will continue the process as before. The only exception to this rule is during a combustion cycle.

When a combustion cycle is in process and power failure occurs, the computer-based device 37 will note the last temperature of the combustion cycle. If the temperature in the incineration chamber 58 was less than a predetermined temperature, e.g., 1000° F., the computer-based device 37 will re-start the combustion cycle as soon as power is restored. The computer-based device 37 will turn on the exhaust fan 114 and purge the incineration chamber 58 for a predetermined time, e.g., 2 minutes. Once the purging is complete, the computer-based device 37 will turn on the catalytic converter 80. When the temperature in the catalytic converter 80 has reached a predetermined temperature, e.g., 300° F., the computer-based device 37 will turn on the exhaust fan 114, magnetron, and, 5 minutes later, the heating element 60. When the temperature in the incineration chamber 58 has reached combustion temperature, e.g., 300° F., the computer-based device 37 will turn off the catalytic converter 80 and continue the burn process.

If the temperature in the incineration chamber 58 was equal or greater than a predetermined temperature, e.g., 1000° F. when power failure occurred, the computer-based device 37 will treat the process as having been completed and will continue the process on "Demand" as soon as power is restored.

The above described embodiment is set forth by way of example and is not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A waste treatment device for treatment of waste containing solid and liquid waste which comprises:

a primary waste reservoir for accepting solid and liquid waste;

a solids processor operably connected to said primary waste reservoir to receive waste therefrom and having means for combusting a substantial part of the solid waste and generating a resultant waste and gas;

a secondary waste reservoir operably connected to said solids processor and to said primary waste reservoir to receive the resultant waste directly and separately therefrom;

a liquid processor operably connected to said secondary waste reservoir to receive the resultant waste in a manner to separate at least, a part of the resultant waste into an environmentally safe water and another part into a resultant waste concentrate to said solids processor for combustion therein, and first means communicably interconnecting said liquid processor and said solid processor for transferring the resultant waste concentrate to said solid processor for combustion therein.

2. The waste treatment device of claim 1, which further includes a gas processor operably connected to said solids processor to treat the gas in a manner to render a resultant environmentally acceptable air.

3. The waste treatment device of claim 2, which further includes means for automatically controlling at least one of said accepting of waste in said primary waste reservoir, said receipt of waste in said solids processor, said means for combustion of said solid waste, said receipt of the resultant waste in said secondary waste reservoir, said receipt of the resultant waste in said liquid processor, and transfer of the resultant waste concentrate to said solids processor and said gas processor.

4. The waste treatment device of claim 2, wherein said gas processor includes a catalytic converter for catalytically treating the gas.

5. The waste treatment device of claim 4, wherein said gas processor includes a heat exchanger operably connected to said catalytic converter for cooling said resultant air.

6. The waste treatment device of claim 4 wherein said catalytic converter contains platinum coated pellets.

7. The waste treatment device of claim 1, which further includes conduit means communicably interconnecting said primary waste reservoir and said secondary waste reservoir for transferring a part of liquid waste therebetween.

8. The waste treatment device of claim 7, wherein said conduit means is further characterized as transferring the part of the liquid waste from said primary waste reservoir to said secondary waste reservoir.

9. The waste treatment device of claim 1, which further includes means for automatically controlling at least one of said accepting of waste in said primary waste reservoir, receipt of waste in said solids processor, said means for combusting of said solid waste said receipt of the resultant waste in said secondary waste reservoir, said receipt of the resultant waste in said liquid processor and transfer of the resultant waste concentrate to said solids processor.

10. The waste treatment device of claim 1, wherein said transfer means includes second conduit means for transferring the resultant waste concentrate to said secondary waste reservoir and third conduit means for transferring the resultant waste concentrate from said secondary waste reservoir to said solids processor.

11. The waste treatment device of claim 1, wherein the solid waste is further characterized to include large particulate waste and small particulate waste and wherein said solids processor includes a porous plate for substantially separating the large particulate waste from the small particulate waste such that the large particulate waste remains in said solids processor.

12. The waste treatment device of claim 1, wherein said solids processor includes means for microwaving the waste.

13. The device of claim 1, wherein said liquid processor includes a filtering membrane.

14. The waste treatment device of claim 1, wherein said combustion means includes a combustion chamber having a heating element operably disposed therein with a heat conductive material operably disposed adjacent said heating element and further includes means for producing microwaves within said combustion chamber.

15. The waste treatment device of claim 1, wherein said liquid processor includes means operably connected thereto for irradiating the liquid waste to substantially rid said liquid waste free from biological contaminants.

16. The waste treatment device of claim 1, which further includes means for at least partially separating the liquid waste and the solid waste.

17. A waste treatment device for treatment of waste containing solid and liquid waste which includes:

a primary waste reservoir for accepting solid and liquid waste;

a solids processor operably connected to said primary waste reservoir to receive waste therefrom and having means for combusting a substantial part of the solid waste and generating a resultant waste and gas;

a secondary waste reservoir operably connected to said solids processor and to said primary waste reservoir to receive the resultant waste directly and separately therefrom;

a liquid processor operably connected to said primary waste reservoir to receive the resultant waste in a manner to separate at least a part of the resultant waste into an environmentally safe water and another part into a resultant waste concentrate; and transfer means communicably interconnecting said primary water reservoir and said secondary waste reservoir for allowing a part of liquid waste to flow there between.

18. The waste treatment device of claim 17, which further includes a gas processor operably connected to said solids processor to treat the gas in a manner to render a resultant environmentally acceptable air.

19. The waste treatment device of claim 18, which further includes means for automatically controlling at least one of said accepting of waste in said primary waste reservoir, said receipt of waste in said solids processor, said means for combustion of said solids, said receipt of the resultant waste in said secondary waste reservoir, said receipt of the resultant waste in said liquid processor, and transfer of the resultant waste concentrate to said solids processor and said gas processor.

20. The waste treatment device of claim 18, wherein said gas processor includes a catalytic converter for catalytically treating gas.

21. The waste treatment device of claim 20, wherein said gas processor includes a heat exchanger operably connected to said catalytic converter for cooling said resultant substantially contaminant free air.

22. The waste treatment device of claim 20 wherein said catalytic converter contains platinum coated pellets.

23. The waste treatment device of claim 18, wherein said liquid processor includes means operably connected for irradiating the liquid waste to substantially rid said liquid waste free from biological contaminants.

24. The waste treatment device of claim 17, which further includes first conduit means communicably interconnecting said liquid processor and said solid processor for transferring the resultant waste concentrate to said solids processor for combustion therein.

25. The waste treatment device of claim 24, wherein said first conduit means is further characterized as allowing flow of the part of the liquid waste from said primary waste reservoir to said secondary waste reservoir.

26. The waste treatment device of claim 17, which further includes means for automatically controlling at least one of said accepting of waste in said primary waste reservoir, said receipt of waste in said solids processor, said means for combustion of said solids, said receipt of the resultant waste in said secondary waste reservoir, said receipt of the resultant waste in said liquid processor and flow of the liquid waste from said primary waste reservoir to said secondary waste reservoir.

27. The waste treatment device of claim 17, wherein said transfer means includes second conduit means for transferring the resultant waste concentrate to said secondary waste reservoir and third conduit means for transferring the resultant waste concentrate to said solids processor.

28. The waste treatment device of claim 17, wherein the solid waste is further characterized to include large particulate waste and small particulate waste and wherein said solids processor includes a porous plate for substantially separating the large particulate waste from the small particulate waste such that the large particulate waste remains in said solids processor.

29. The waste treatment device of claim 17, wherein said solids processor includes means for microwaving the waste.

30. The waste treatment device of claim 17, wherein said liquid processor includes a filtering membrane.

31. The waste treatment device of claim 17, wherein said combustion means includes a combustion chamber having a heating element operably disposed therein with a heat conductive material operably disposed adjacent said heating element and further includes means for producing microwaves within said combustion chamber.

32. The waste treatment device of claim 17, which further includes means for at least partially separating the liquid waste and the solid waste.

33. A waste treatment device for treatment of waste containing solid and liquid waste which includes:
   a primary waste reservoir for accepting solid and liquid waste;
   a solids processor operably connected to said primary waste reservoir to receive waste therefrom and having means for combusting a substantial part of the solid waste and generating a resultant waste and gas, wherein said combusting means includes a porous plate;
   a secondary waste reservoir operably connected to said solids processor and to said primary waste reservoir to receive the resultant waste directly and separately therefrom; and
   a liquid processor operably connected to said secondary waste reservoir to receive the resultant waste in a manner to separate at least a part of the resultant waste into an environmentally safe water and another part into a resultant waste concentrate.

34. The waste treatment device of claim 33, wherein said primary waste reservoir includes means for at least partially separating the liquid waste and the solid waste.

35. The waste treatment device of claims 33, which further includes transfer means communicably interconnecting said liquid processor and said solid processor for transferring the resultant waste concentrate to said solid processor for combustion therein.

36. The waste treatment device of claim 35, wherein said transfer means includes first conduit means for transferring the resultant waste concentrate to said secondary waste reservoir and second conduit means for transferring the resultant waste concentrate to said solids processor.

37. The waste treatment device of claim 35, which further includes means for automatically controlling at least one of said accepting of the waste in said primary waste reservoir, said receipt of waste in said solids processor, said means for combustion of said solid waste, said receipt of the resultant waste in said secondary reservoir, said receipt of the resultant waste in said liquid processor and said means for transferring the resultant waste concentrate to said solids processor.

38. The waste treatment device of claim 33, which further includes a gas processor operably connected to said solids processor to treat the gas in a manner to render a resultant environmentally acceptable air.

39. The waste treatment device of claim 38, which further includes means for automatically controlling at least one of said accepting of the waste in said primary waste reservoir, said receipt of waste in said solids processor, said means for combustion of said solid waste, said receipt of the resultant waste in said secondary reservoir, and said receipt of the resultant waste in said liquid processor and said gas processor.

40. The waste treatment device of claim 38, wherein said gas processor includes a catalytic converter for catalytically treating gas.

41. The waste treatment device of claim 40, wherein said gas processor includes a heat exchanger operably connected to said catalytic converter for cooling said resultant substantially contaminant free air.

42. The waste treatment device of claim 40 wherein said catalytic converter contains platinum coated pellets.

43. The waste treatment device of claim 33, which further includes first conduit means communicably interconnecting said primary waste reservoir and said secondary waste reservoir for allowing flow of a part of liquid waste therebetween.

44. The waste treatment device of claim 43, wherein said first conduit means is further characterized as allowing flow of the part of the liquid waste from said primary reservoir to said secondary reservoir.

45. The waste treatment device of claim 33, which further includes means for automatically controlling at least one of said accepting of the waste in said primary waste reservoir, said receipt of waste in said solids processor, said means for combustion of said solid waste, said receipt of the resultant waste in said secondary reservoir, and said receipt of the resultant waste in said liquid processor.

46. The waste treatment device of claim 31, wherein said solids processor includes means for microwaving the waste.

47. The waste treatment device of claim 33, wherein said liquid processor includes a filtering membrane.

48. The waste treatment device of claim 33, wherein said combustion means includes a combustion chamber having a heating element operably disposed therein with a heat conductive material operably disposed adjacent said heating element and further includes means for producing microwaves within said combustion chamber.

49. The waste treatment device of claim 33, wherein said liquid processor includes means operably connected for irradiating the liquid waste to substantially rid said liquid waste free from biological contaminants.

50. A waste treatment device for treatment of waste containing solid and liquid waste which includes:
   a primary waste reservoir for accepting solid and liquid waste, said primary waste reservoir having means for at least partially separating the liquid waste and the solid waste;
   a solids processor operably connected to said primary waste reservoir to receive waste therefrom and having means for combusting a substantial part of the solid waste and generating a resultant waste and gas;

a secondary waste reservoir operably connected to said solids processor and to said solids processor and to said primary waste reservoir to receive the resultant waste directly and separately therefrom; and a liquid processor operably connected to said secondary waste reservoir to receive the resultant waste in a manner to separate at least a part of the resultant waste into an environmentally safe water and another part into a resultant waste concentrate.

51. The waste treatment device of claim 50, wherein said combusting means includes a porous plate.

52. The waste treatment device of claim 50, which further includes transfer means communicably interconnecting said liquid processor and said solid processor for transferring the resultant waste concentrate to said solid processor for combustion therein.

53. The waste treatment device of claim 52, wherein said transfer means includes second conduit means for transferring the resultant waste concentrate to said secondary waste reservoir and third conduit means for transferring the resultant waste concentrate to said solids processor.

54. The waste treatment device of claim 52, which further includes means for automatically controlling at least one of said accepting of the waste in said primary waste reservoir, said receipt of waste in said solids processor, said means for combustion of said solid waste, said receipt of the resultant waste in said secondary reservoir, and said receipt of the resultant waste in said liquid processor and said transfer of the resultant waste concentrate to said solids processor.

55. The waste treatment device of claim 50, which further includes a gas processor operably connected to said solids processor to treat the gas in a manner to render a resultant environmentally acceptable air.

56. The waste treatment device of claim 55, which further includes means for automatically controlling at least one of said accepting of the waste in said primary waste reservoir, said receipt of waste in said solids processor, said means for combustion of said solid waste, said receipt of the resultant waste in said secondary reservoir, and said receipt of the resultant waste in said liquid processor and said gas processor.

57. The waste treatment device of claim 55, wherein said gas processor includes a catalytic converter for catalytically treating gas.

58. The waste treatment device of claim 57, wherein said gas processor includes a heat exchanger operably connected to said catalytic converter for cooling said resultant substantially contaminant free air.

59. The waste treatment device of claim 57 wherein said catalytic converter contains platinum coated pellets.

60. The waste treatment device of claim 50, which further includes first conduit means communicably interconnecting said primary waste reservoir and said secondary waste reservoir for allowing flow of a part of the liquid waste therebetween.

61. The waste treatment device of claim 60, wherein said first conduit means is further characterized as allowing flow of the part of the liquid waste from said primary reservoir to said secondary reservoir.

62. The waste treatment device of claim 50, which further includes means for automatically controlling at least one of said accepting of the waste in said primary waste reservoir, said receipt of waste in said solids processor, said means for combustion of said solid waste, said receipt of the resultant waste in said secondary reservoir, and said receipt of the resultant waste in said liquid processor.

63. The waste treatment device of claim 50, wherein said solids processor includes means for microwaving the waste.

64. The waste treatment device of claim 50, wherein said liquid processor includes a filtering membrane.

65. The waste treatment device of claim 50, wherein said combustion means includes a combustion chamber having a heating element operably disposed therein with a heat conductive material operably disposed adjacent said heating element and further includes means for producing microwaves within said combustion chamber.

66. The waste treatment device of claim 50, wherein said liquid processor includes means operably connected for irradiating the liquid waste to substantially rid said aqueous fluid free from biological contaminants.

67. A waste treatment device for treatment of waste containing solid waste and liquid waste which includes:

a primary waste reservoir for accepting solid and liquid waste;

a solids processor operably connected to said primary waste reservoir to receive waste therefrom and having means for combusting a substantial part of the solid waste and generating a resultant waste and gas;

a secondary waste reservoir operably connected to said solids processor and to said primary waste reservoir to receive the resultant waste directly and separately therefrom;

a liquid processor operably connected to said secondary waste reservoir to receive the resultant waste in a manner to separate at least a part of the resultant waste into an environmentally safe water and another part into a resultant waste concentrate; and means for automatically controlling at least one of said receipt of waste in said primary waste reservoir, said receipt of waste in said solids processor, said means for combustion of said solid waste, said receipt of the resultant waste in said secondary waste reservoir and said receipt of the resultant waste in said liquid processor.

68. The waste treatment device of claim 67, which further includes transfer means communicably interconnecting said liquid processor and said solid processor for transferring the resultant waste concentrate to said solid processor for combustion therein.

69. The waste treatment device of claim 68, wherein said transfer means includes first conduit means for transferring the resultant waste concentrate to said secondary waste reservoir and second conduit means for transferring the resultant waste concentrate from said secondary waste reservoir to said to said solids processor.

70. The waste treatment device of claims 68, wherein the solid waste is further characterized to include large particulate waste and small particulate waste and wherein said solids processor includes a porous plate for substantially separating the large particulate waste from the small particulate waste such that the large particulate waste remains in said solids processor.

71. The waste treatment device of claim 68, wherein said solids processor includes means for microwaving the waste.

72. The waste treatment device of claim 68, wherein said liquid processor includes a filtering membrane.

73. The waste treatment device of claim 68, wherein said combustion means includes a combustion chamber having a heating element operably disposed therein with a heat conductive element operably disposed adjacent said heating element and further includes means for producing microwaves within said combustion chamber.

74. The waste treatment device of claim 68, wherein said liquid processor includes means operably connected thereto for irradiating the liquid waste to substantially rid said liquid waste free from biological contaminants.

75. The waste treatment device of claim 68, which further includes first conduit means for at least partially separating the liquid waste and the solid waste.

76. The waste treatment device of claim 67, which further includes a gas processor operably connected to said solids processor to treat the gas in a manner to render a resultant environmentally acceptable air.

77. The waste treatment device of claim 76, wherein said gas processor includes a catalytic converter for catalytically treating the gas.

78. The waste treatment device of claim 77, wherein said gas processor includes a heat exchanger operably connected to said catalytic converter for cooling said resultant air.

79. The waste treatment device of claim 77 wherein said catalytic converter contains platinum coated pellets.

80. The waste treatment device of claim 67, which further includes transfer means communicably interconnecting said primary waste reservoir and said secondary waste reservoir for transferring a part of the liquid waste therebetween.

81. The waste treatment device of claim 80, wherein said transfer means is further characterized as transferring the part of the liquid waste from said primary waste reservoir to said secondary waste reservoir.

\* \* \* \* \*